United States Patent
Van Asselt et al.

(10) Patent No.: US 8,461,542 B2
(45) Date of Patent: Jun. 11, 2013

(54) RADIATION DETECTOR WITH A STACK OF CONVERTER PLATES AND INTERCONNECT LAYERS

(75) Inventors: Rob Van Asselt, Valkenswaard (NL); Cornelis Slob, Eindhoven (NL); Nicolaas Johannes Anthonius Van Veen, Geldrop (NL); Christian Baeumer, Hergenrath (BE); Roger Steadman Booker, Aachen (DE); Christoph Herrmann, Aachen (DE); Johannes Wilhelmus Weekamp, Beek en Donk (NL); Klaus Jurgen Engel, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 106 days.

(21) Appl. No.: 13/062,710

(22) PCT Filed: Sep. 1, 2009

(86) PCT No.: PCT/IB2009/053800
§ 371 (c)(1),
(2), (4) Date: Mar. 8, 2011

(87) PCT Pub. No.: WO2010/026527
PCT Pub. Date: Mar. 11, 2010

(65) Prior Publication Data
US 2011/0168904 A1      Jul. 14, 2011

(30) Foreign Application Priority Data

Sep. 8, 2008  (EP) .................................. 08163838
Feb. 6, 2009  (EP) .................................. 09152277

(51) Int. Cl.
*G01T 1/24*      (2006.01)

(52) U.S. Cl.
USPC ..................................................... 250/370.01

(58) Field of Classification Search
USPC .................. 250/370.01, 370.09, 361 R, 366, 250/368; 378/4, 19
See application file for complete search history.

(56) References Cited

U.S. PATENT DOCUMENTS 5,400,218 A   3/1995   Val
5,526,230 A   6/1996   Val
(Continued)

FOREIGN PATENT DOCUMENTS

EP   0490739 A1   6/1992
EP   565391 A1    10/1993
(Continued)

OTHER PUBLICATIONS

Val, C.: "The Future of 3D Packaging"; 1998 IEMT/IMC Proceedings, pp. 261-271.

(Continued)

*Primary Examiner* — David Porta
*Assistant Examiner* — Faye Boosalis

(57) ABSTRACT

The invention relates to a radiation detector and a method for its production, wherein a series of converter plates (110) and interconnect layers (120), which extend into a border volume (BV) lateral of the converter plates (110), are stacked. By filling voids in the border volume (BV) with an underfill material and cutting through the border volume, a contact surface (CS) is generated in which electrical leads (123) of the interconnect layers (120) lie free. To allow a good contacting, said leads (123) are preferably provided with enlargements in the contact surface, for example by bonding wires (132) to them.

20 Claims, 12 Drawing Sheets

U.S. PATENT DOCUMENTS

| | | |
|---|---|---|
| 5,637,536 A | 6/1997 | Val |
| 5,640,760 A | 6/1997 | Val et al. |
| 5,847,448 A | 12/1998 | Val et al. |
| 5,885,850 A | 3/1999 | Val |
| 6,191,465 B1 | 2/2001 | Freeouf |
| 6,236,051 B1 | 5/2001 | Yamakawa et al. |
| 6,716,672 B2 | 4/2004 | Val |
| 6,727,503 B1 | 4/2004 | Gerstenmayer |
| 6,809,367 B2 | 10/2004 | Val |
| 6,844,570 B2 | 1/2005 | Sekine et al. |
| 7,212,604 B2 | 5/2007 | Tkaczyk et |
| 2002/0153492 A1 | 10/2002 | Sekine et al. |
| 2005/0067579 A1 | 3/2005 | Tsuchiya et al. |

FOREIGN PATENT DOCUMENTS

| | | |
|---|---|---|
| EP | 0593330 A1 | 4/1994 |
| EP | 682365 A1 | 11/1995 |
| EP | 1521099 A1 | 4/2005 |
| FR | 2645681 A1 | 10/1990 |
| FR | 2704690 A | 11/1994 |
| JP | 2000307145 A | 11/2000 |
| WO | 9318549 A1 | 9/1993 |
| WO | 0026992 A1 | 5/2000 |
| WO | 0145172 A1 | 6/2001 |
| WO | 0159841 A1 | 8/2001 |
| WO | 0209182 A1 | 1/2002 |

OTHER PUBLICATIONS

Montemont et al: A Capacitive Frisch Grid Structure for CdZnTe Detectors; IEEE Transactions on Nucliear Science, Jun. 2001, vol. 48, No. 3, pp. 278-281.

RADIATION DETECTOR WITH A STACK OF CONVERTER PLATES AND INTERCONNECT LAYERS

FIELD OF THE INVENTION

The invention relates to a radiation detector with a stack of converter plates and interconnect layers and to a method for producing such a detector.

BACKGROUND OF THE INVENTION

The U.S. Pat. No. 7,212,604 B2 discloses a Computed Tomography (CT) detector module comprising a stacked arrangement of layers of a direct conversion material for absorbing X-radiation and converting it into electrical signals that can be counted. The layers have anodes and a cathode on their surfaces that are realized by a flexible foil which is bent at the periphery and then connected to a substrate or carrier on which the conversion material is mounted.

SUMMARY OF THE INVENTION

Based on this background it was an object of the present invention to provide an alternative design of a radiation detector that is particularly suited for handling high flux rates of radiation.

This object is achieved by a radiation detector according to claim 1, 3, or 6, a method according to claim 7, and an imaging device according to claim 15. Preferred embodiments are disclosed in the dependent claims.

The present invention relates to radiation detectors for the detection of electromagnetic radiation, particularly of X-ray photons or γ photons. The radiation detectors comprise a stack of converter plates and associated interconnect layers. Typically, one or two interconnect layers are disposed between each pair of consecutive converter plates in some regular, periodic pattern. The converter plates are made from a suitable direct conversion material that transforms incident radiation to be detected into electrical signals, particularly into electrical charges (e.g. electron-hole pairs in the conduction band of the material). The interconnect layers may for example be just isolating substrates, isolating substrates with electrical leads on one or both surfaces, substrates with processing electronics, and/or electrically conductive plates. As their names indicate, the converter plates and the interconnect layers have a substantially flat, approximately two-dimensional geometry, and these elements are put with their flat sides onto each other in a stacking direction that is perpendicular to their plane.

A first kind of radiation detector according to the present invention further comprises at least one electrode system, which will be called "external electrode system" in the following, that is disposed on at least one surface of the stack. The electrode system by definition comprises at least one electrically conductive "external electrode" which is in general electrically isolated from the stack. The surface with the electrode system is preferably a surface of the stack that is parallel to the stacking direction.

The aforementioned design of a radiation detector is advantageous because the external electrode system can be used to positively affect processes taking place inside the stack of converter plates and interconnect layers. Thus it is for example possible to increase the spectral resolution of the radiation detector by taking influence on the temporal shape of electrical pulses that are generated in the converter plates by absorbed incident radiation, in particular by restricting the extension of generated charge clouds and thus reducing the tailing of the resulting pulses.

The external electrode system can have many different designs. A surface of the stack of converter plates and interconnect layers can for example completely be covered by one single external electrode, or it can be covered by a structured array of several such external electrodes. In the latter case, the external electrodes are preferably located near anodes of the converter plates in the stack. Moreover, preferably all surfaces of the stack, which are not yet occupied by other components (e.g. readout electronics), are covered with one or more external electrodes.

In principle, it would be possible to operate the external electrode system with a floating potential. Preferably, the electrode system is however connected to a voltage supply which can provide a well-defined voltage, particularly a voltage that lies in the range of the voltages which are supplied to electrodes in the stack of converter plates and interconnect layers. The latter electrodes are typically operated as anodes and cathodes which are disposed on opposite sides of the converter plates and which are used to collect electrical pulses generated in the converter material by incident radiation. The voltage supplied to the external electrode system is therefore preferably between the corresponding anode and the cathode voltages.

According to a further aspect, the invention relates to a second kind of radiation detector which also comprises a stack of converter plates and interconnect layers of the kind described above for the first radiation detector. Optionally the second radiation detector may comprise the features of the first radiation detector; however, this needs not necessarily be the case as both detectors constitute separate, independent solutions of the present invention. The second radiation detector is characterized in that it comprises a Peltier cooling device for removing heat from the stack of converter plates and interconnect layers. The Peltier cooling device will typically have a flat geometry that is suited to cover a large part of the stack. As known in the state of the art, Peltier elements or devices are able to transfer heat from one location to another when an appropriate voltage is applied to them.

The provision of a radiation detector with a Peltier cooling device has the advantage that heat can actively be removed from the converter plates and interconnect layers, thus preventing problems with an overheating of the detector. Such problems are particularly threatening for the described stacked arrangement of converter plates and interconnect layers in a dense, three-dimensional configuration, because the passive thermal conductivity of the materials will hardly suffice to remove enough of the heat produced by the many pixels and the associated processing circuitry. The Peltier cooling device allows to conduct such heat rapidly from the sensitive components into regions where it can readily be dissipated.

During operation, the Peltier cooling device will have a "cold" region or surface where heat is absorbed and a "hot" region or surface where this heat is delivered. To guarantee a sufficient removal of heat from the stack of converter plates and interconnect layers, said hot region of the Peltier device will usually be connected to an appropriate heat sink. According to a preferred embodiment of the invention, the Peltier cooling device is connected to an electrical conductor which provides electrical access to components inside the stack. The electrical conductor, which is already present for other purposes, can thus additionally be used as a heat sink for the Peltier cooling device.

According to a further aspect, the invention relates to a third kind of radiation detector which also comprises a stack of converter plates and interconnect layers of the kind described above for the first and second radiation detector. Optionally the third radiation detector may comprise the features of the first and/or second radiation detector; however, this needs not necessarily be the case as all detectors constitute separate, independent solutions of the present invention.

The third radiation detector has the following further features:

The interconnect layers extend with electrical leads into a rigid body that fills a volume which is disposed laterally of (and usually adjacent to) the converter plates and will be called "border volume" in the following. In this context, the "lateral" direction corresponds to a direction perpendicular to the stacking direction. Moreover, the volume of the stack of converter plates and interconnect layers in which also converter plates are present will be called "stack core" in the following to distinguish it from the border volume. Finally, the term "lead" shall denote any electrically conductive component independent of its particular geometric shape.

The aforementioned electrical leads of the interconnect layers end in a surface of the border volume, wherein this surface will be called "contact surface" in the following because the leads can be contacted in this plane by external circuits. The contact surface is typically perpendicular or slanted with respect to the plane of the converter plates and interconnect layers.

The invention further relates to a method for producing a radiation detector (particularly one with the aforementioned design) that comprises the following steps:
a) Stacking converter plates and interconnect layers such that the interconnect layers extend with electrical leads into a border volume lateral of the converter plates.
b) At least partially filling the voids between the interconnect layers in the border volume (which space is occupied by the converter plates in the stack core) with a material, for example an underfill material.
c) Removing a volume from the border volume to expose the leads of the interconnect layers in a contact surface of the border volume, wherein said surface is created by the cutting process. The cutting will usually require to wait until an initially liquid filling material has solidified.

The described detector and method provide a design with a plurality of sensitive volumes or pixels that can be made sufficiently small such that counting of radiation photons in these volumes is possible even for high photon fluxes. The necessary read-out lines from the sensitive pixels of the converter plates are provided by the leads on the interconnect layers. These leads can readily be contacted by external circuits at the contact surface of the border volume, for example in a flip-chip manner.

In the following, various further developments of the present invention will be described which relate to both the first, second and/or third radiation detector as well as to the described method.

The leads of the interconnect layers have preferably a thickness (measured in stacking direction) of less than 10 µm, most preferably less than 1 µm. Such thin conductive structures can for example be realized by metallization layers on an isolating substrate. To improve their accessibility, the leads of the interconnect layers are preferably provided with enlargements at the contact surface. This provision with enlargements may be done already during the preparation of the interconnect layers, i.e. before or immediately after the stacking step a) of the method, or it may be done after the cutting in step c).

The enlargements of the leads of the interconnect layers preferably have an internal diameter in the contact surface of at least 20 µm, most preferably at least 50 µm. In this context, the "internal diameter" of a connected geometrical shape is defined as the diameter of the largest circle that completely fits into this shape. In a rectangle, the internal diameter would for example correspond to the length of the shorter side. The mentioned values for the internal diameter guarantee that sufficient area is provided in the contact surface for a reliable bonding of external contacts.

The enlargements of the leads of the interconnect layers may be realized in different ways. According to a first option, the enlargements comprise a metallization on the contact surface. Such a metallization can particularly be generated after cutting through the border volume to expose the electrical leads. It can be produced by standard processes of semiconductor technology, e.g. vapor deposition of a metallic layer and subsequent etching with a suitable mask.

According to another embodiment, the enlargements comprise additional conductor material that is bonded to the leads and cut in the contact surface. In contrast to the aforementioned metallization on the contact surface, the conductor material extends from the contact surface into the depth of the border volume. Particular examples of additional conductor materials are wires bonded at least one position (in the border volume or in the stack core) to the corresponding lead. Another example is a block of a metal or a solder bump attached to the corresponding lead. This option can be combined with the deposition of a metallic layer as described above.

The radiation detector may optionally comprise at least one interconnect layer comprising a conductive material that extends through the whole thickness of this layer (as above, the thickness being measured in the stacking direction). This layer will in the following be called "conductive interconnect layer" or also "cathode interconnect layer" due to its typical use during operation. It may optionally completely consist of the conductive material, e.g. of copper. In this case the whole layer and the electrical lead on it are identical.

One or more of the aforementioned conductive interconnect layers may optionally be disposed between and in electrical contact to two consecutive converter plates. The contacted surfaces of these converter plates are therefore electrically connected and thus during operation on the same electrical potential, which is usually the case for the cathodes. This design will in the following be called "face-to-face" arrangement because identical electrodes (e.g. cathodes) of the two consecutive converter plates face each other.

According to another embodiment of the invention, the radiation detector comprises at least one interconnect layer that has an electrically isolating substrate with leads on (at least) one surface. This layer will in the following be called "isolating interconnect layer" or also "anode interconnect layer" due to its typical use during operation. Its design allows to structure the leads into for example a pattern of several electrodes which run isolated form each other on the surface of the substrate. Moreover, the isolating interconnect layer can be used to electrically isolate two consecutive converter plates from each other when being disposed between them. This can be applied to generate a "back-to-face" arrangement in which different electrodes (i.e. cathode and anode) of two consecutive converter plates face each other, or back-to-back arrangement, where the isolating layer separates the adjacent anode sides of two consecutive converter plates.

In another preferred embodiment, the radiation detector comprises at least one of both a conductive and an isolating interconnect layer, wherein the conductive interconnect layer is disposed in contact to the isolating interconnect layer between two subsequent converter plates. The substrate of the isolating interconnect layer can then be used for electrically isolating the conductive interconnect layer from one of the two converter plates. The (at least) one surface of the isolating interconnect layer that is provided with leads is usually disposed in contact to one of the two converter plates.

According to another embodiment of the invention, at least one of the interconnect layers does not completely cut through the border volume (and does therefore not partition it into two parts). This may particularly be realized for a conductive interconnect layer for which it suffices that only one narrow conductive track extends into the border volume.

In general, the leads of the interconnect layers may serve any purpose and for example connect integrated circuits on the interconnect layer. Preferably, the leads are however used to electrically contact the converter plates. This is for example achieved in an embodiment in which the interconnect layer comprises at least one electrode that contacts the surface of a converter plate and that is connected to a lead of the interconnect layer. Typically, the electrode and the lead will just be two different regions of one and the same conductive material.

According to a further development of the aforementioned design, the interconnect layer comprises a plurality of such electrodes (each of them being connected to a different lead) that form a pixelated array. In correspondence to this array, the converter plate which is contacted by it is functionally subdivided into pixels in which detection events can separately be counted.

The radiation detector may optionally comprise (at least) two groups of interconnect layers and two associated contact surfaces of the border volume, wherein said contact surfaces are distinct from each other. Preferably, the contact surfaces may be perpendicular to each other. In this design, different electrical potentials can for example be applied to the two groups of interconnect layers, i.e. they can be driven as anodes and cathodes, respectively, and it is possible to contact these different electrodes in different planes (the distinct contact surfaces).

The invention further relates to an imaging device comprising a radiation detector of the kind described above. The imaging device may particularly be an X-ray, CT (Computed Tomography), PET (Positron Emission Tomography), SPECT (Single Photon Emission Computed Tomography) or nuclear imaging device.

BRIEF DESCRIPTION OF THE DRAWINGS

These and other aspects of the invention will be apparent from and elucidated with reference to the embodiment(s) described hereinafter. These embodiments will be described by way of example with the help of the accompanying drawings in which.

Like reference numbers or numbers differing by integer multiples of 100 refer in the Figures to identical or similar components. It should further be noted that the Figures depict only a small part of a complete radiation detector, which typically comprises multiple slabs, varying from tens to hundreds depending on the detector size.

DETAILED DESCRIPTION OF EMBODIMENTS

Direct conversion materials are used in medical detectors to convert X-ray and γ-ray irradiation directly to electron-hole pairs. When energy information from the incoming radiation is required, such as in spectral CT, photons are counted separately for different energy bins (and pixels). One of the issues with photon counting detectors is the high count rates needed for direct beam detection, which typically cannot be covered by the electronics. A method to overcome this problem is to subdivide the detector pixels in three dimensions (i.e. in the direction of incidence and in the plane perpendicular thereto). This substructuring can be achieved by "horizontal" or "vertical" stacking of multiple detector slabs, wherein it is assumed that the direction of incidence of radiation is "vertical" (z-direction in the Figures).

Figure 1:
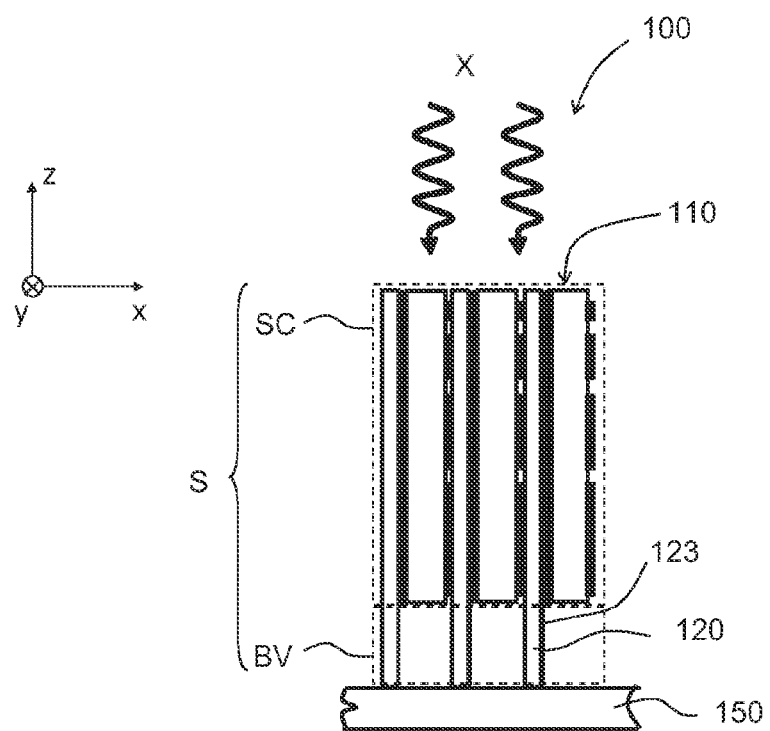
FIG. 1 shows schematically a side view of a part of a radiation detector with slabs being parallel to the (vertical) direction of incidence of radiation.
Figure 2:
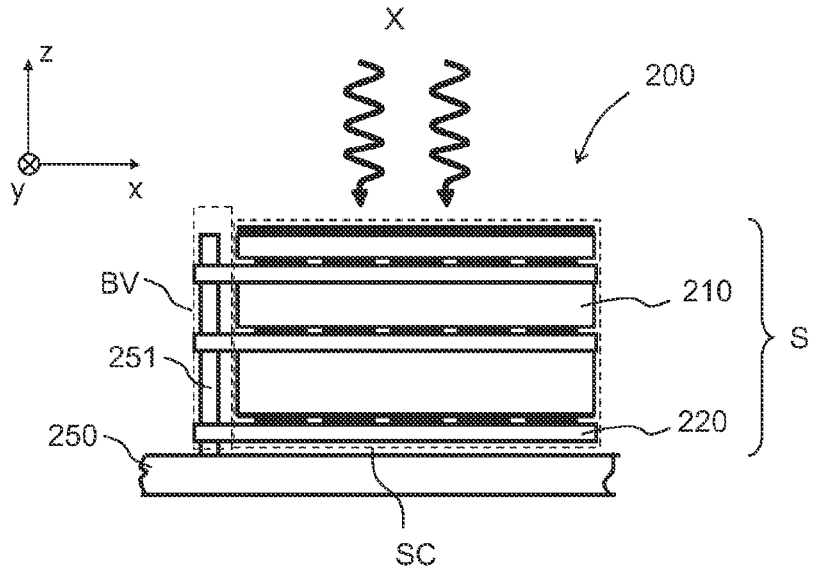
FIG. 2 shows schematically a side view of a part of a radiation detector with slabs being perpendicular to the direction of incidence of radiation.

FIG. 1 shows in this respect the alternative of a radiation detector 100 in which the slabs, which by definition are the building blocks that each comprise a plate of converter material ("converter plate") 110 and at least one adjacent interconnect layer 120, are orientated vertically and the "stacking direction" is the x-direction. FIG. 2 shows a radiation detector 200 in which the slabs with the converter plates 210 and the interconnect layers 220 are orientated horizontally and the "stacking direction" is the z-direction. The set of interconnect layers typically comprises interconnect layers that consist of isolating substrates with electrical leads on one or both surfaces which can optionally carry additional processing electronics (e.g. realized by ASICs). Moreover, the interconnect layers of this set can be electrically conductive plates, or alternatively be passive interposers for isolation purposes.

The described stacking of multiple slabs results in many interconnects to be made. In each slab the contacts between the associated converter plate and interconnect layer are made by a flip chip process, and from each interconnect layer a typical number of 10 to 300 electrical leads (depending on the device and electronics selected) will come out of the "stack core" SC and lead into the laterally neighboring "border volume" BV. When a detector tile is built, the slabs are stacked and the leads of each slab need to be connected to a substrate for the read-out of the electronic signals, e.g. to a Printed Circuit Board (PCB) or the like. Said substrates are usually perpendicular to the direction of radiation, as can be seen for the substrate 150 in FIG. 1 and the substrate 250 in FIG. 2. In both cases the lead structure needs to be contacted in a perpendicular direction. In particular, the vertical leads on the interconnect layers 120 in FIG. 1 need to make contact to the horizontal substrate 150. The horizontal leads on the interconnect layers 220 in FIG. 2, on the contrary, cannot directly contact the horizontal substrate 250 but need an additional "redistribution layer" 251 for making their connections to the substrate 250. The redistribution layer 251 can for instance be a metallization for re-routing or a bus structure (if the slabs comprise a part of the active electronics, a bus structure may be established for the interconnect layers, e.g. for power supply, data bus for read-out, etc.).

Because the X-ray beam defines a particular direction, vertical and horizontal layering schemes differ in further respects. For instance, in FIG. 2 the redistribution layer 251 could be realized for the vertical distribution of supply lines to electronics within the interconnect layers 220 and for bias voltage distribution. However, electrical and mechanical interconnect to the substrate 250 are realized at the bottom side of the stack S. For that the redistribution layer 251 could be extended (not shown) to the short, bottom side of the stack S. Alternatively, the bottom layer of the stack S may comprise contacts for contact to the substrate 250.

Irrespective of the mentioned differences, it will in the following be assumed without loss of generality that the slabs are vertically arranged as in FIG. 1, because a person skilled in the art will readily be able to adapt the description to the horizontal arrangement of FIG. 2 or other design variants.

The current invention describes solutions to achieve the contacts from the vertical interconnect layers 120 to the horizontal substrate 150. In essence this is done by making the interconnect layers 120 with the electrical leads 123 on them larger than the converter plates 110. This makes the interconnect layers 120 extend outside the "active array" or stack core SC into the adjacent border volume BV. By cutting the interconnect layers, their leads become accessible from a contact surface at the bottom side of the device. As the contact area on the leads is rather small, some enlargement is usually needed, for example a metallization or the bonding of conductive components such as metal blocks, (solder) bumps or wirebonds. These options will be described in more detail below with respect to FIGS. 3 to 9.

The invention further relates to particular solutions for achieving the contacts from the cathode side in the slabs to the substrate. Methods that can be used here are similar to those used for interconnecting the anode side, except that now no pixilation may be needed (because the cathode is typically continuous, not patterned; if the cathode is patterned, all electrodes are usually connected to the same potential by a short). For ease of contacting the cathodes, an alternative option is to place the slabs face-to-face (cathodes of two adjacent slabs being in contact). These options for stacking and the high voltage connection of the cathode are described in more detail below with respect to FIGS. 10 to 13.

Figure 3:
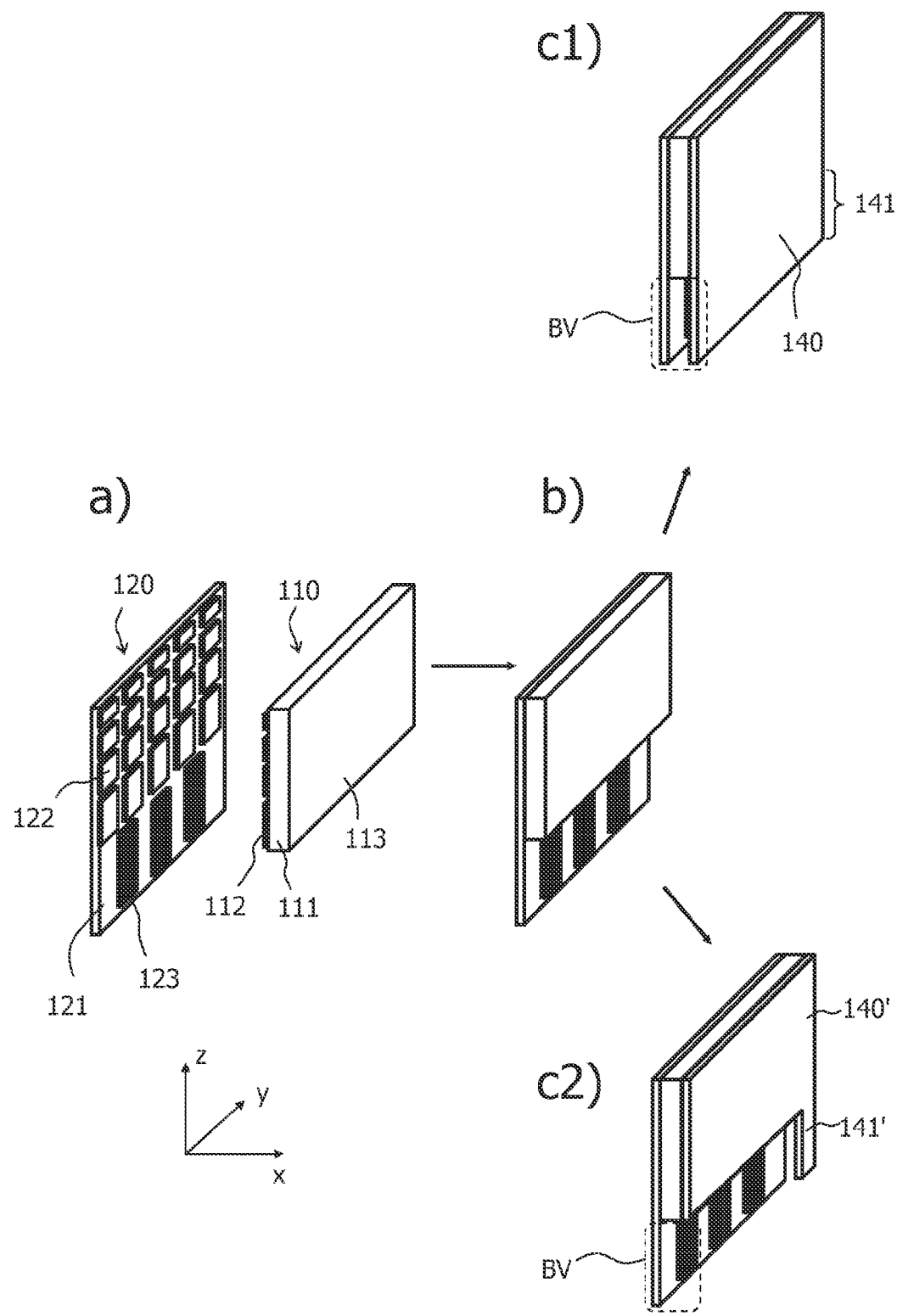
FIG. 3 illustrates in a perspective consecutive steps of the production process of one slab for a radiation detector according to the present invention.

FIG. 3 illustrates the assemblage of a single slab of a radiation detector according to the present invention. The procedure starts in step a) with two prefabricated components, i.e. a converter plate 110 comprising a flat cuboid of converter material 111 with an anode side 112 and a cathode side 113. Suitable materials for the converter material are any materials that provide the desired conversion of incident photons into electrical charges. They comprise for example Si, Ge, GaAs, HgI, CZT (cadmium zinc telluride), and/or CdTe.

In the shown example, the anode side 112 is patterned into an array of differently sized single electrodes such that electrical charges generated by radiation in corresponding sub-volumes of the converter material 111 can separately be registered via the corresponding read-out leads.

A second prefabricated component is the interconnect layer 120 which comprises an isolating substrate 121 (e.g. a plastic, glass or silicon plate) having in its upper part a pattern of contact pads 122 that matches the pattern of anodes 112 on the converter plate 110 such that the pads 122 can electrically contact the anodes 112 in a one-to-one manner (it may not necessarily be matched in size, only in position). Moreover, the interconnect layer 120 comprises electrical leads 123 providing electrical access to the contact pads 122. It should be noted that those parts of the leads 123 that can be seen in the Figure extend into the lower section of the interconnect layer 120, while the further routing to the individual contact pads 122 is not visible. Moreover, it is assumed that some signal processing is done in the interconnect layer 120 close to the converter plate and that therefore the number of leads in the lower part is less than the number of pixels present.

In step b), the interconnect layer 120 and the converter plate 110 are attached to each other with the anodes 112 being electrically connected to the contact pads 122.

In the next step, electrical contacts with the cathode side 113 of the converter plate 110 have to be realized. FIG. 3 illustrates two of several options to do this, namely in step c1) the attachment of a full-area "conductive interconnect layer" or "cathode interconnect layer" 140 covering the complete cathode side 113 of the converter plate and with a "lead" 141 also the additional region below it in the border volume BV (thus partitioning the border volume into two parts). In the alternative step c2), the cathode interconnect layer 140' also covers the complete cathode side 113, but extends only with a stripe-shaped lead 141' of reduced width (measured in y-direction) into the border volume BV. The cathode interconnect layers 140, 140' are typically realized by a conductive material like a metal (e.g. copper).

In the following, different solutions will be described that allow to make external electrical contacts to the electrical leads 123 on the interconnect layers 120 such that the slabs can readily be mounted on a carrier substrate 150 (FIG. 1). The first part of this discussion will concentrate on the anodes 122 and the corresponding leads 123 on the "anode interconnect layers" 120. The cathode interconnect layers 140, 140' (FIG. 3) can be treated analogously (in fact, the distinction between "anodes" and "cathodes" only depends on the applied electrical potentials during the operation of the detector). Moreover, particular solutions with respect to the cathode interconnect layers will be discussed in more detail in a second part of the description.

Figure 4:
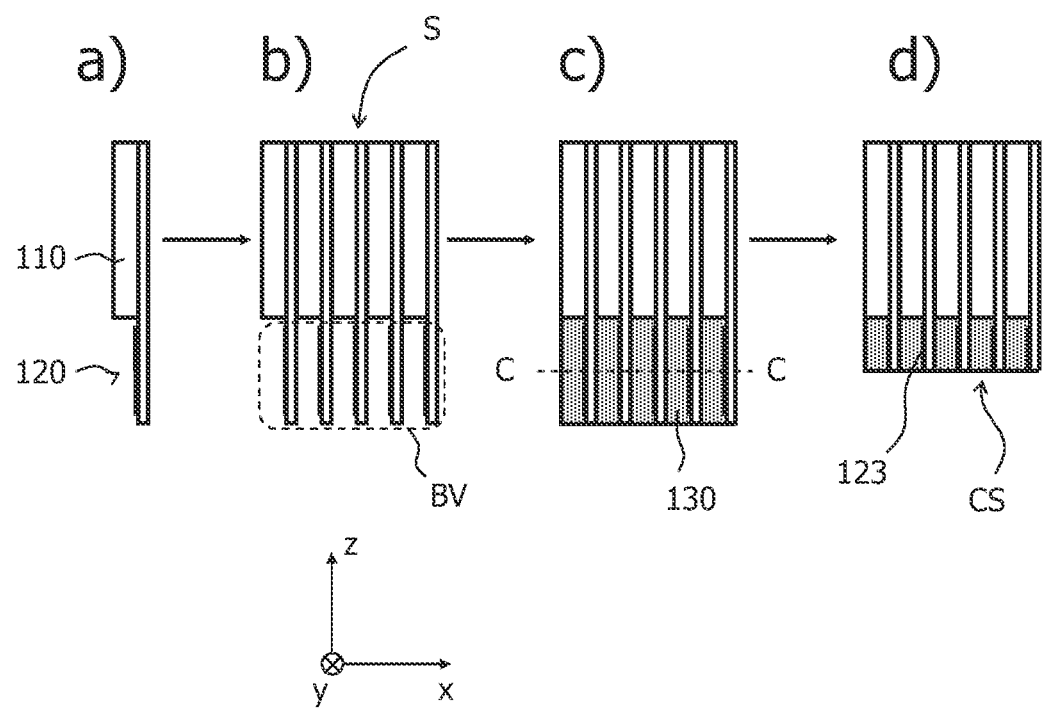
FIG. 4 illustrates in a side view consecutive steps of the assemblage of several slabs into a stack.

FIG. 4 illustrates in a schematic side view consecutive steps of the assemblage of several slabs for a radiation detector.

Step a) of this procedure starts with the slabs that have been prefabricated, for example in the way illustrated in FIG. 3, by coupling a converter plate 110 with an interconnect layer 120 that extends beyond the lower edge of the converter plate into a border volume BV. As mentioned above, the cathode layers are neglected in this representation for simplicity (a cathode could e.g. be realized on the side of the interconnect layer 120 opposite to the side connected to the converter plate 110).

In step b), a plurality of identical single slabs is assembled to a stack S in the stacking direction x. The resulting body can be considered as a tile because it constitutes a planar component (extending in x and y-direction) for building a complete radiation detector.

In step c), the voids between the lower sections of the interconnect layers 120 that exist in the border volume BV (because the converter plates 110 do not extend into this volume) are filled with an underfill material, e.g. an electrically isolating polymer. As indicated by the line C-C, the border volume BV is cut in the next step d), for example by dicing and polishing, such that the leads 123 of the interconnect layers become accessible from the bottom side. This bottom side will be called "contact surface" CS in the following.

Figure 5:
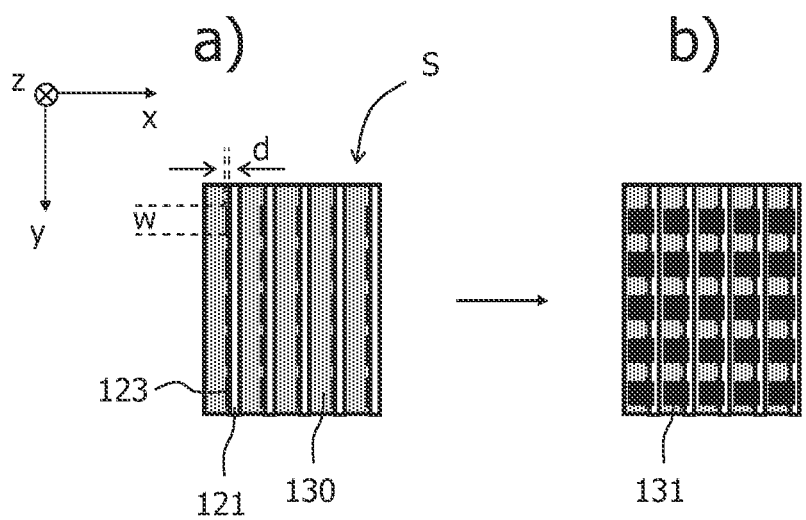
FIG. 5 illustrates in a bottom view the metallization of contacts onto the contact surface of the aforementioned stack.

FIG. 5 a) shows a view onto the contact surface CS that was generated by the described procedure. It can be seen that the electrical leads 123 on the isolating substrates 121 of the interconnect layers lie free. However, their accessible area is rather small: the product of width w×thickness d of the lead-metallization is typically in the order of maximum 250×2 μm² when a thick metal layer of two micron is used. This is too small to interconnect readily and reliably.

As illustrated in step b) of FIG. 5, a metallization 131 is therefore applied to the leads 123. This can for example be done by first depositing a metal on the complete contact surface CS and then etching away the excess metal around the desired bond pads 131 with the help of a suitable mask. The remaining bond pads 131 then constitute enlargements of the electrical leads 123 to allow good contacting.

Figure 6:
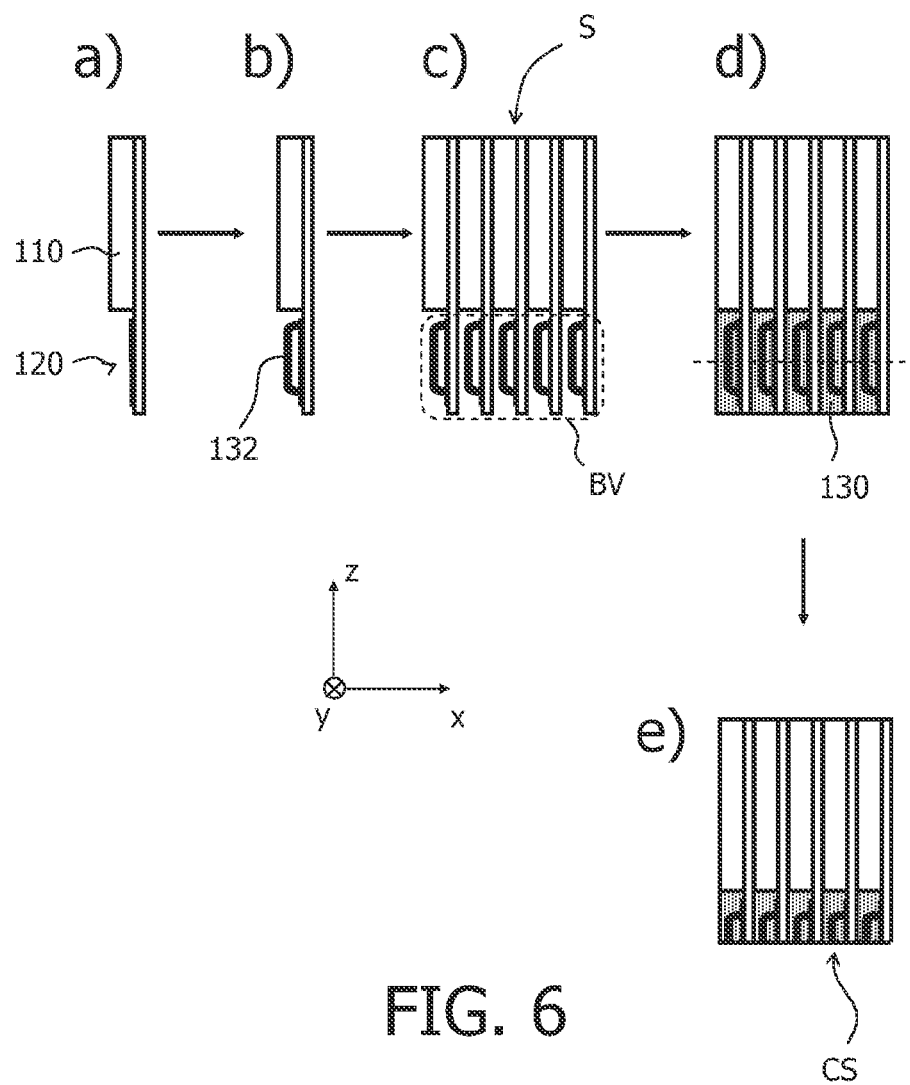
FIG. 6 illustrates in a side view consecutive steps of the assemblage of several slabs into a stack with wires bonded to the electrical leads.

FIG. 6 shows an alternative method for creating enlargements of the electrical leads 123. According to this approach, the single slabs provided in step a) are further processed in step b) by bonding a wire 132 to their electrical leads 123. The residual steps c)-e) (stacking, underfilling, and cutting) are analogous to steps b)-d) of FIG. 4.

Figure 7:
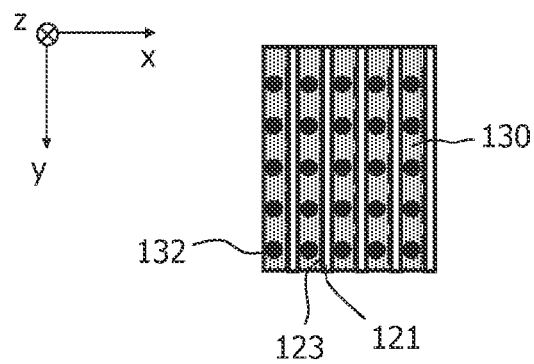
FIG. 7 shows a bottom view onto the contact surface of the aforementioned stack.

FIG. 7 shows a view onto the contact surface CS of the resulting stack; it can be seen that now both the wires 132 and the corresponding electrical leads 123 are accessible. The advantage of the described approach is that the size of the pads is determined by the size of the wire, which typically has a diameter of 20 to 100 micron. The pads can be used directly as the bondpad for external connections, or their size can be increased further by an additional metallization step (analogous to that of FIG. 5).

Figure 8:
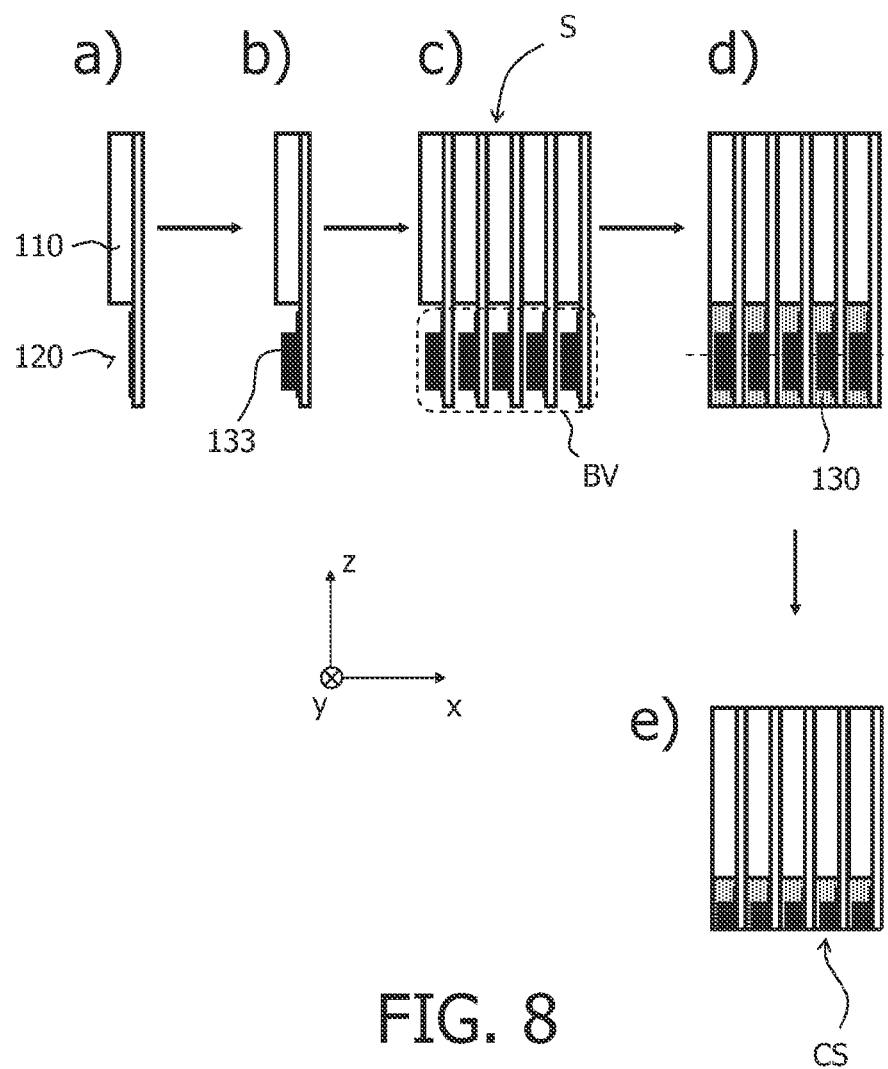
FIG. 8 illustrates in a side view consecutive steps of the assemblage of several slabs into a stack with metal blocks bonded to the electrical leads.
Figure 9:
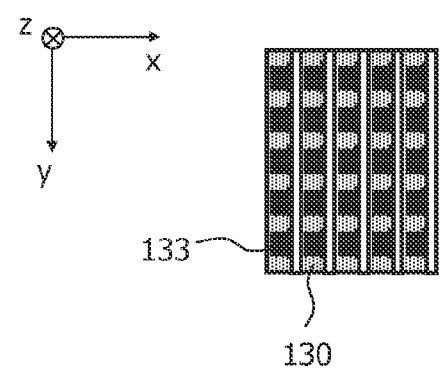
FIG. 9 shows a bottom view onto the contact surface of the aforementioned stack.

FIGS. 8 and 9 illustrate a further option to produce an enlargement of the electrical leads. According to FIG. 8, metal parts 133 are applied to the electrical leads 123 of the slabs, which are then further processed (stacked, underfilled, and cut) as above. The application of the metal parts can for example be done by attaching a block (e.g. copper) or a solder bump, which after dicing results in the bondpad for further interconnect to external circuits. Like for the pads obtained via a wirebond, the pad size can optionally further be enlarged by adding a metallization.

In the following, several particular solutions for the cathode interconnect layers will be described in more detail. The cathodes interconnect layers 140, 140' shown in FIG. 3 can in principle be considered and treated like the interconnect layers 120 discussed above. The particular feature of the cathode interconnect layers is that they have only a single electrode, i.e. they are not pixelated. Moreover, a cathode interconnect layer will typically be completely electrically conductive. It can therefore also be considered as a "conductive interconnect layer" in contrast to the "isolating interconnect layers 120".

In the examples that will be described below, the contact area to the leads 123 at the anode interconnect layers 120 is shown to have an enlargement made by a metal part. However, any of the methods described above could instead be used for creating corresponding enlargements.

Moreover, the cathode interconnect layer 140 or 140' is shown as a single layer in the examples. In practice this layer can be combined with other layers in the stack. Thus it can for example be attached to the back side of the anode interconnect layer 120 when a back-to-face stack is used. The electrical contact from the cathode interconnect layer to the cathode side 113 of a converter plate 110 can be made in conventional ways, e.g. like conductive adhesive, solder or conductive foil processing.

Finally, the complete cathode side 113 will be covered by the cathode interconnect layer 140, 140' in the following examples. When the cathode is continuous and not patterned, the cathode interconnect layer might alternatively cover only a part of the cathode side 113.

Figure 10:
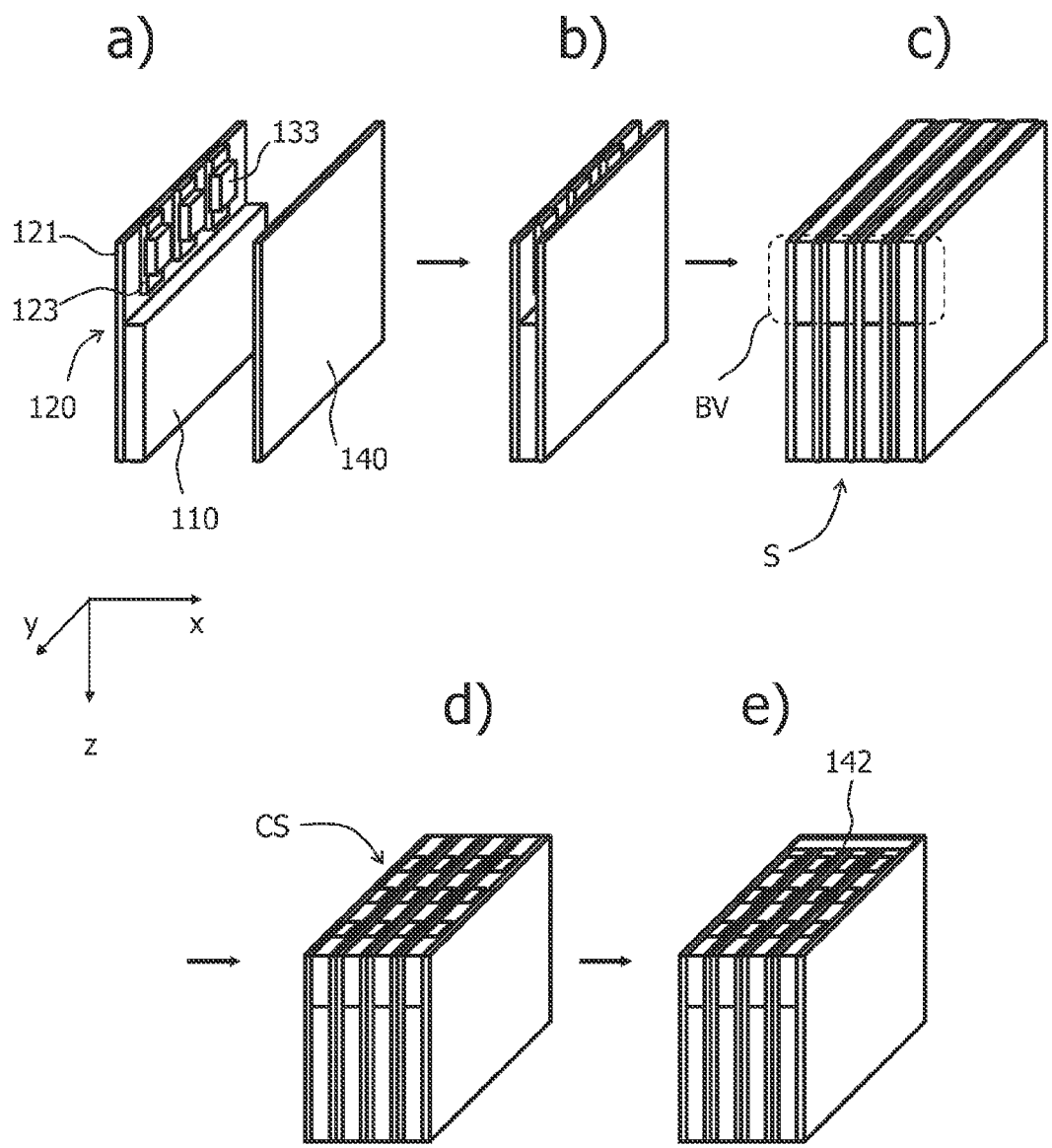
FIG. 10 illustrates consecutive steps of the manufacture of a radiation detector according to the present invention comprising a cathode extending over the whole width of the border volume.

A schematic assembly sequence for a first example is shown in FIG. 10. In this embodiment slabs are first created in steps a) and b) by sandwiching a converter plate 110 between an isolating anode interconnect layer 120 and a conductive cathode interconnect layer 140. The cathode interconnect layer 140 extends in this embodiment to the edge of the module over the entire width (y-direction) of the slab. It should be noted that the representation in this and the following Figures is turned by 180° with respect to the previous Figures, i.e. the border volume BV is now on the top side of the drawing and radiation would be incident from below.

The generated slabs are then assembled to a stack S in step c) in a back-to-face arrangement and the voids in the border volume are filled with an underfill material. In step d), the border volume BV has been cut to expose the leads of the anode interconnect layers and the cathode interconnect layers. In this case the anode contact pads are arranged in a matrix, the cathode connections in lines on the contact surface CS.

Step e) shows that the cathode interconnect layers can be connected at one edge by a line 142 on the contact surface CS. When the design of the external anode connection is adapted to accommodate some open space at one or two sides of the module, the line 142 can be used to connect all high voltage (HV) connections to the cathodes. In this way not all cathodes need to be connected separately, but in principle one HV connection to the PCB is sufficient. It is also possible to choose an intermediate solution: connect several cathodes to each other in groups, but not connect all cathodes together.

Figure 11:
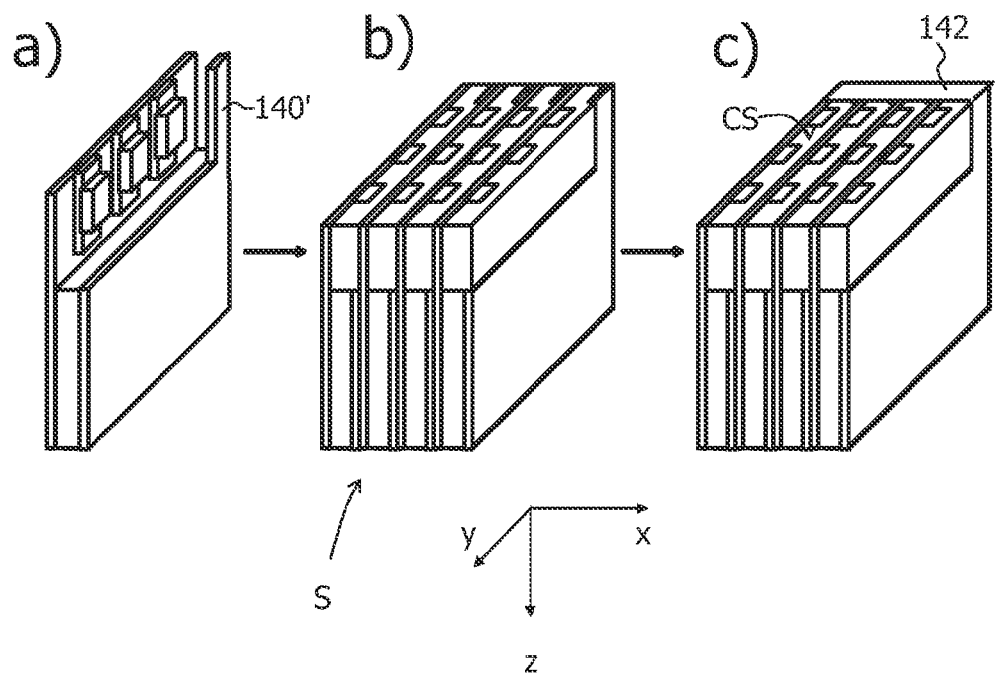
FIG. 11 illustrates a similar process with the cathode extending only partially into the border volume.

FIG. 11 illustrates cathode interconnect layers 140' that extend into the border volume BV only over a limited width of the slab, which is sufficient to achieve a contact. As in the previous example, all cathode layers 140' may be connected by a line 142 at one edge of the contact surface CS. The connection in a limited area may be done by using a sheet or foil, but can also be done by using a wirebond or a conductive part connected to the cathode interconnect layer.

Figure 12:
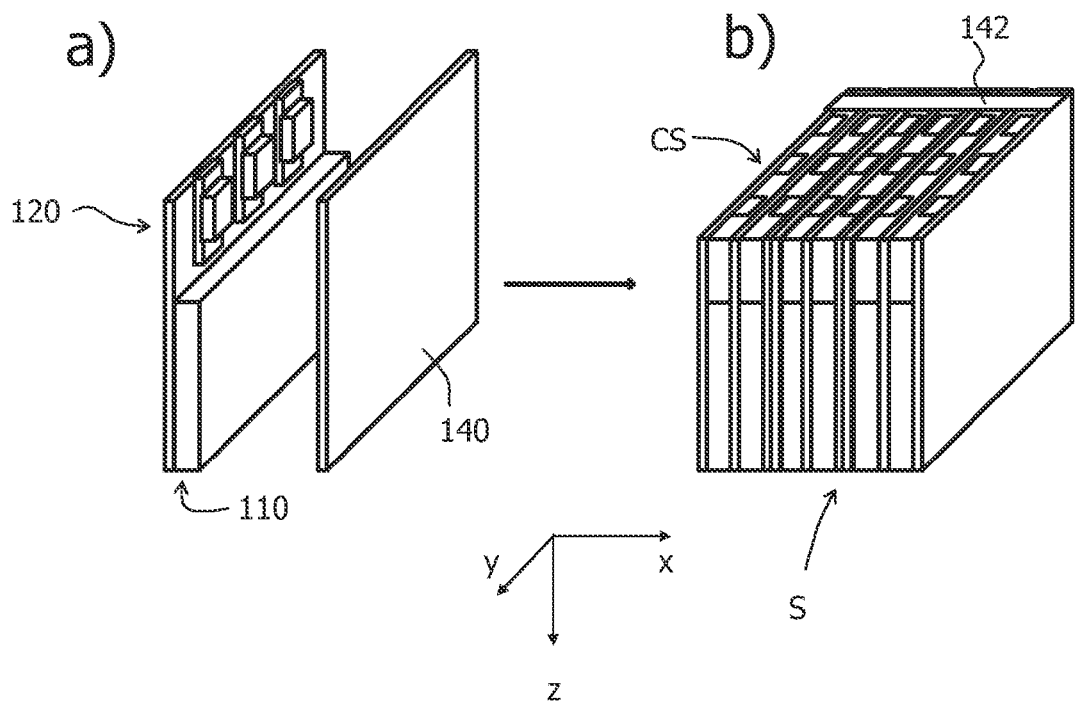
FIG. 12 illustrates the assemblage of a radiation detector with cathode layers in a back-to-face arrangement.

In the example shown in FIG. 12 the slabs are stacked in a face-to-face arrangement. In this way the cathode interconnect layers 140 of adjacent slabs can be connected into a single layer. Similar to the previous examples, the cathode interconnect layer may extend into the border volume over the full width of the slab (shown in FIG. 12) or only over a reduced width (not shown). Moreover, several or all cathode interconnect layers may be connected by leads 142 to reduce the number of contacts to be made to the PCB.

Figure 13:
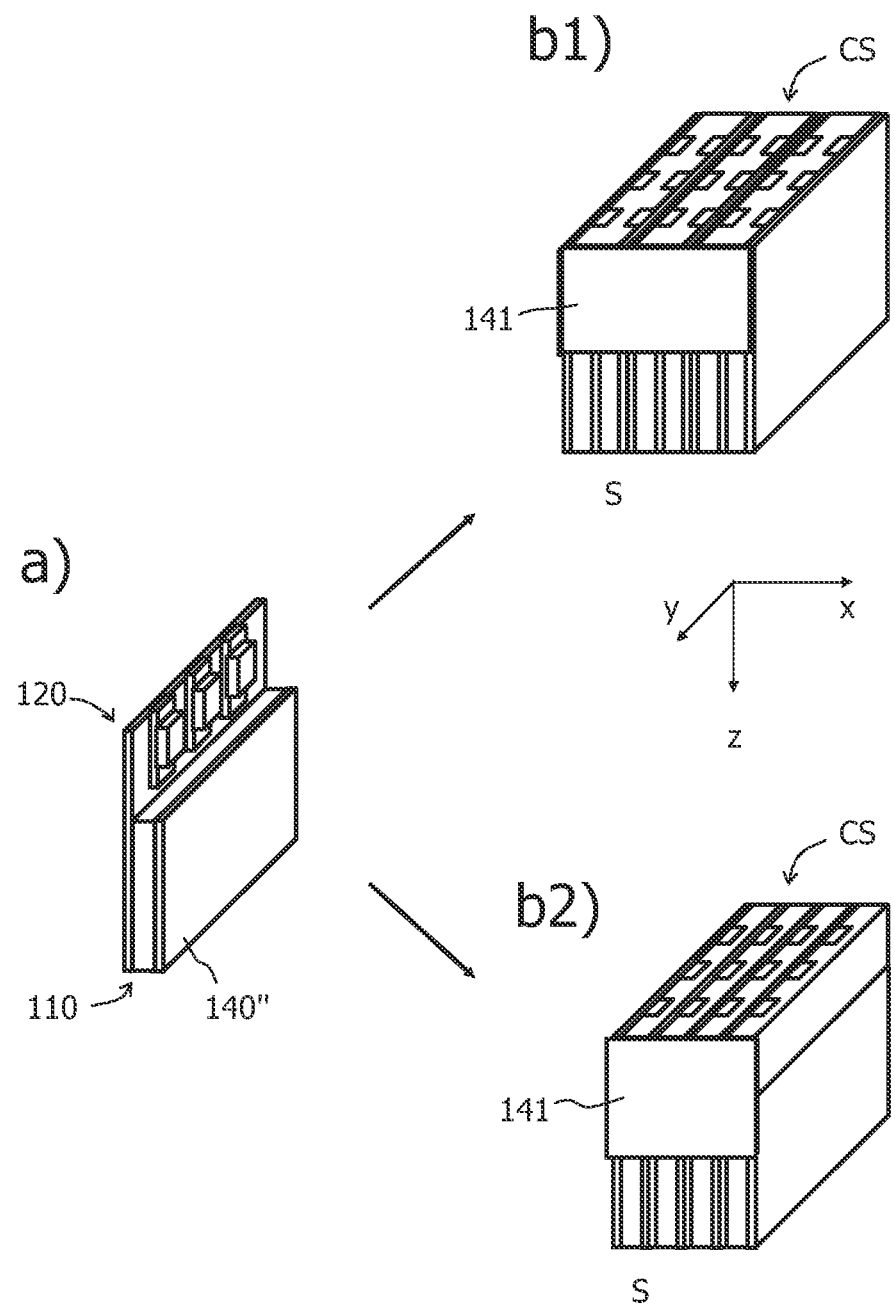
FIG. 13 illustrates the assemblage of a radiation detector with cathode layers being connected at a side face.

In the example shown in FIG. 13, the slabs are either stacked in a face-to-face arrangement (alternative b1) or a back-to-face arrangement (alternative b2), and contact to the cathode interconnect layers is made via the front side of the module in a plane perpendicular to the contact surface CS (in which the anode interconnect layers 120 are contacted). In this case the cathode interconnect layer 140" does not need to extend into the border volume, and the connections of the anodes and cathodes to the PCB are not made from the same side of the module, reducing the chance of shorts or other electrical problems.

In the drawings the external contact 141 to the cathode interconnect layer 140, 140' is shown as a sheet. However, it could also be made of wires or "blocks" for the connection to the edge of the module (the same methods can be used to enlarge the area for interconnect of the cathode as those described above for the anodes).

The described invention can particularly be used in all applications where thin multiple plates of direct converting detectors are used, e.g. in the area of medical imaging (X-ray and γ-ray conversion) like CT detectors, more specifically spectral CT detectors. In addition the invention can favorably be used in non-medical applications like astrophysics, defense, homeland security and (airport) security systems.

Figure 14:
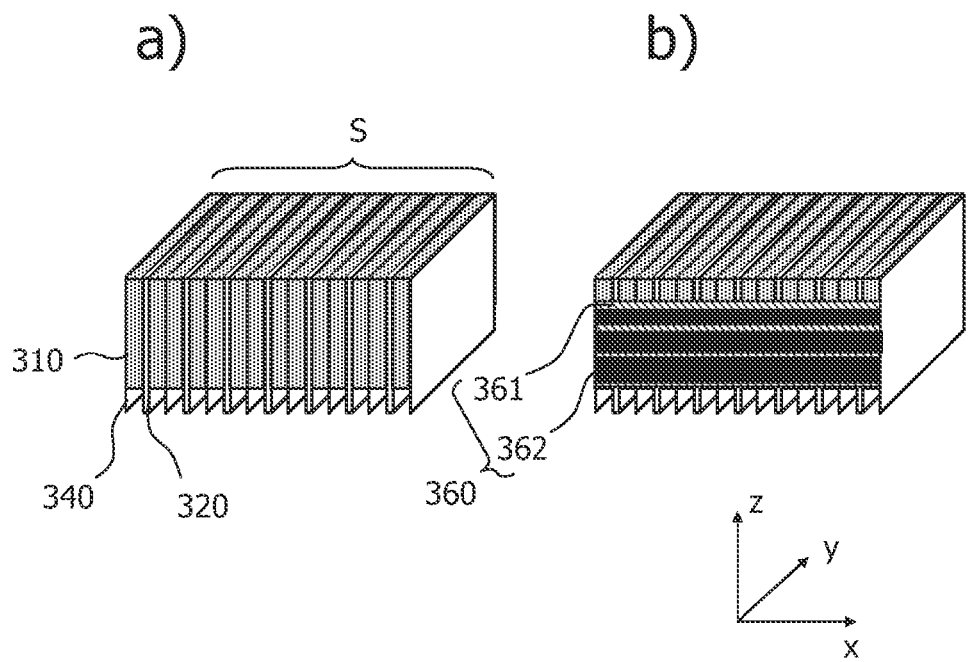
FIG. 14 illustrates in a perspective view consecutive steps of the manufacture of a radiation detector according to another aspect of the present invention, said detector comprising external electrodes on the stack surfaces.
Figure 15:
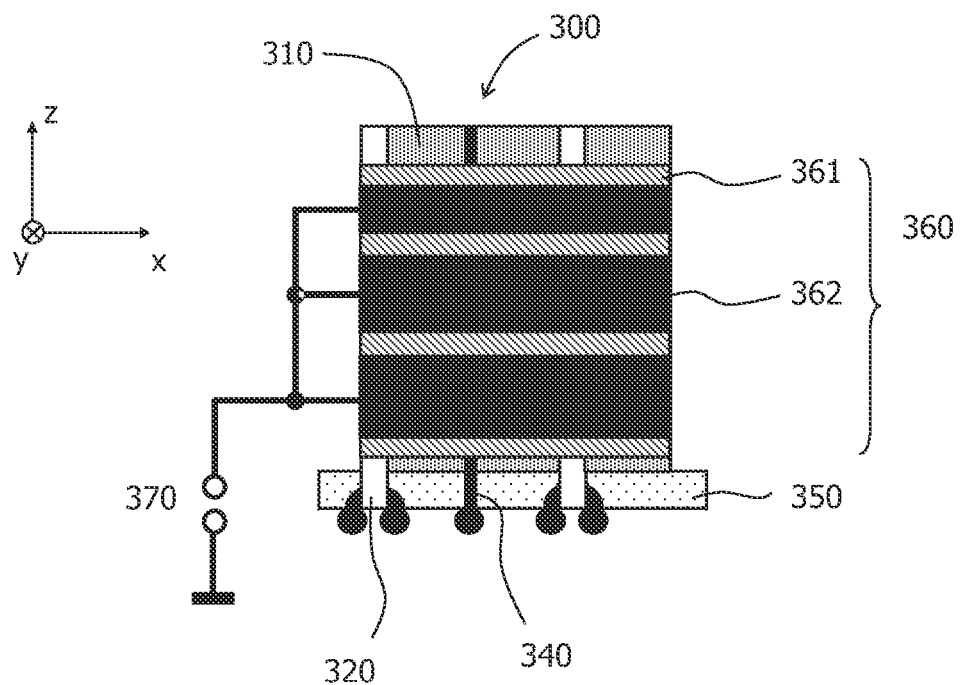
FIG. 15 shows a side view of the aforementioned radiation detector after connection of the interconnect layers to a substrate.

FIGS. 14 and 15 relate to a further aspect of the present invention, which can optionally be used as an independent, standalone solution or as a modification of the designs described above. This part of the invention is motivated by the fact that sub-pixels with various geometrical dimensions (i.e. various aspect ratios) will typically occur in a multi-layer detector since detector design for Spectral CT is predominantly driven by count-rate considerations. This will affect the spectroscopic performance of some types of pixels, because sub-pixel geometry cannot be chosen according to neither the needs of the "small-pixel effect" nor other methods to enhance the electron signal.

The following embodiments of the invention help to recover the optimum spectroscopic performance for edge pixels by the provision of an "external electrode system" comprising one or more additional "external electrodes" on at least one side wall of a stack of converter plates and interconnect layers.

FIG. 14 shows in this respect a first step a) of the production of a stack S of converter plates 310 between which isolating anode interconnect layers 320 and conductive cathode interconnect layers 340 are disposed in an alternating sequence, thus realizing a face-to-face arrangement.

In the next processing step b), an external electrode system 360 has been fabricated on the front face of the stack, said electrode system comprising an electrically isolating layer 361 on which stripe-shaped electrodes 362 extending in x-direction are disposed.

For the generation of the external electrode system 360, the same manufacturing process can be applied as used for the generation of interconnect tracks. The resin of the 3D integration process for the converter plates 310 and interconnect layers 320, 340 already provides an electrical insulation. Further, an additional dielectric layer 361 can be applied.

A (partial) metallization of the side walls can then be applied to generate the external electrodes 362. Metallization of the side walls could start with electroless deposition of nickel, and then layers of copper, nickel and gold can be electrochemically deposited (cf. C. Val, "The future of 3D Packaging", IEMT/IMC Proceedings 1998, 261f). Alternatively, physical vapor deposition techniques can be employed applying for example layers of chromium and copper. Conductive polymers are low-cost alternatives to both techniques described above.

The resulting metal stripes 362 act as neighboring electrodes for the edge anode pixels of each converter layer 310 in the stack. The function of these metal stripes 362 seems to resemble the one of a virtual Frisch grid in ion chamber detectors (cf. G. Montemont et al., "A capacitive Frisch Grid Structure for CdZnTe Detectors", IEEE Trans. Nucl. Sci. 48 (2001) 278, and references therein), i.e. the electrons are stronger coupled to the corresponding pixels by the small-pixel effect. In the energy domain this reduces tailing of the photopeak, e.g. the spectral resolution of the radiation detector is increased.

Though not shown in FIG. 14, the electrode system cannot only be applied to the front side but on all three free long side walls of the stack. Moreover, the electrodes 362 can either be contiguous conductive areas as shown in the Figures, or structured areas (not shown). In the latter case preferably only that part of the side wall of each edge pixel is covered by metal which is close to an anode in the corresponding converter plate 310.

FIG. 15 shows a side view of the stack with the external electrode system 360 after the interconnect layers 320, 340, which extend beyond the core volume of the converter plates 310, are electrically and mechanically connected to a substrate or PCB 350. As already mentioned, this connection may be done by the procedures described with respect to FIGS. 1-13 or alternatively by some other suitable method. The Figure further shows schematically that the external electrodes 362 are connected to a voltage supply 370. Though all electrodes 362 are shown to be on the same potential, each of them might alternatively be connected to a voltage supply of its own to provide it with an individually selectable potential. In a preferred embodiment, the external electrodes 362 are set to a potential between ground, which is about the potential of the anode pixels, and the cathode voltage.

FIGS. 16 to 19 relate to a further aspect of the present invention, which can optionally be used as an independent, standalone solution or as a modification of the designs described above. This part of the invention is motivated by the problem of heat production in a multilayer detector that has to cope with the high photon flux by realizing a high channel density. Signal processing in a readout electronics unit located as close to the direct-conversion elements as possible appears to be mandatory in such detectors, because fanning out a huge number of weak analog signals is impossible (for this reason the interconnect layers 120 were described above to favorably comprise active signal processing circuits). A side effect of operating the electronics within a stack will however be the heating of the whole detection device.

An increased temperature might be beneficial concerning polarization effects if compound semiconductor radiation detectors like CZT or CdTe are used as converter material. On the other hand, leakage currents of semiconductor radiation sensors increase exponentially with temperature. Further, proper operation of CMOS electronics can only be guaranteed up to a certain temperature limit, e.g. 80° C. Thus, one of the mentioned aspects of the detector will define an upper temperature limit. For many envisaged implementations this will require controlling the temperature of the detection device.

Figure 16:
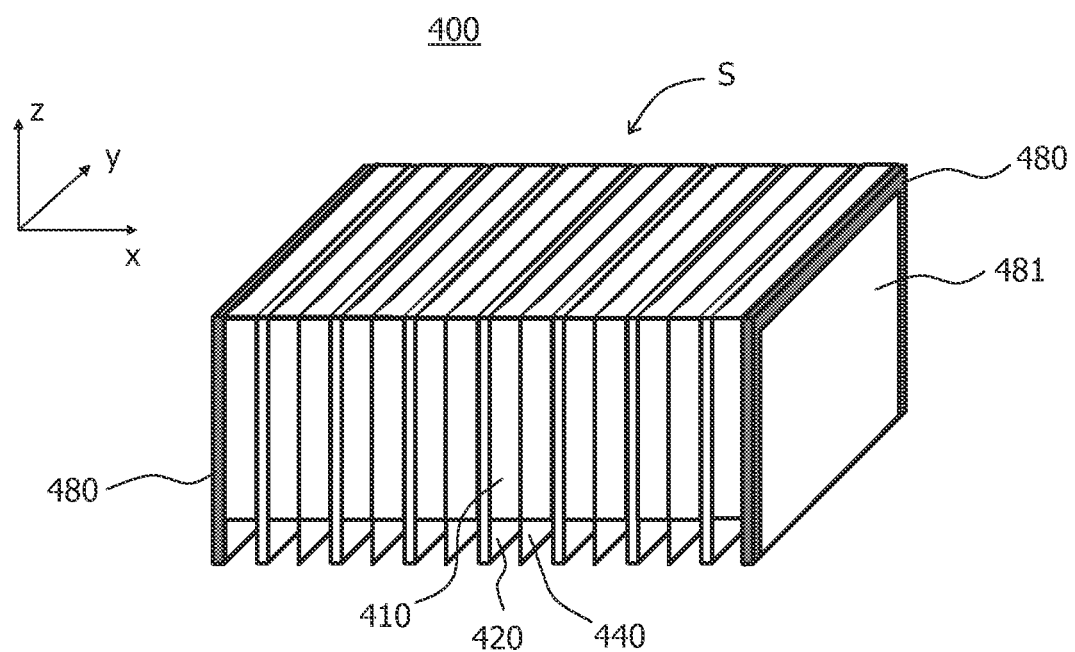
FIG. 16 shows schematically a perspective view of a stack of converter plates and interconnect layers of a radiation detector which comprises a Peltier cooling device.

To address this issue, it is proposed here to provide the radiation detector (or, more particularly, stacks of converter plates and interconnect layers of the radiation detector) with a small Peltier cooling device that can transport heat out of the volume of the stack. FIG. 16 illustrates this for a first particular design of a radiation detector 400 comprising a stack S of converter plates 410 disposed in a face-to-face arrangement with intermediate anode interconnect layers 420 and cathode interconnect layers 440. At the front and the back face of this stack S, which are perpendicular to the stacking direction (x-direction), planar Peltier cooling devices 480 are disposed and operated such that a cold side of each Peltier cooling device 480 faces the stack S while the hot side is oriented to the outside. Moreover, the hot sides of the Peltier cooling devices 480 are connected to a heat conductor, for example a second type of metal sheet 481 that facilitates heat transfer away from the module. The heat conductor 481 may additionally have electrical functions, for example as a cathode layer.

Figure 17:
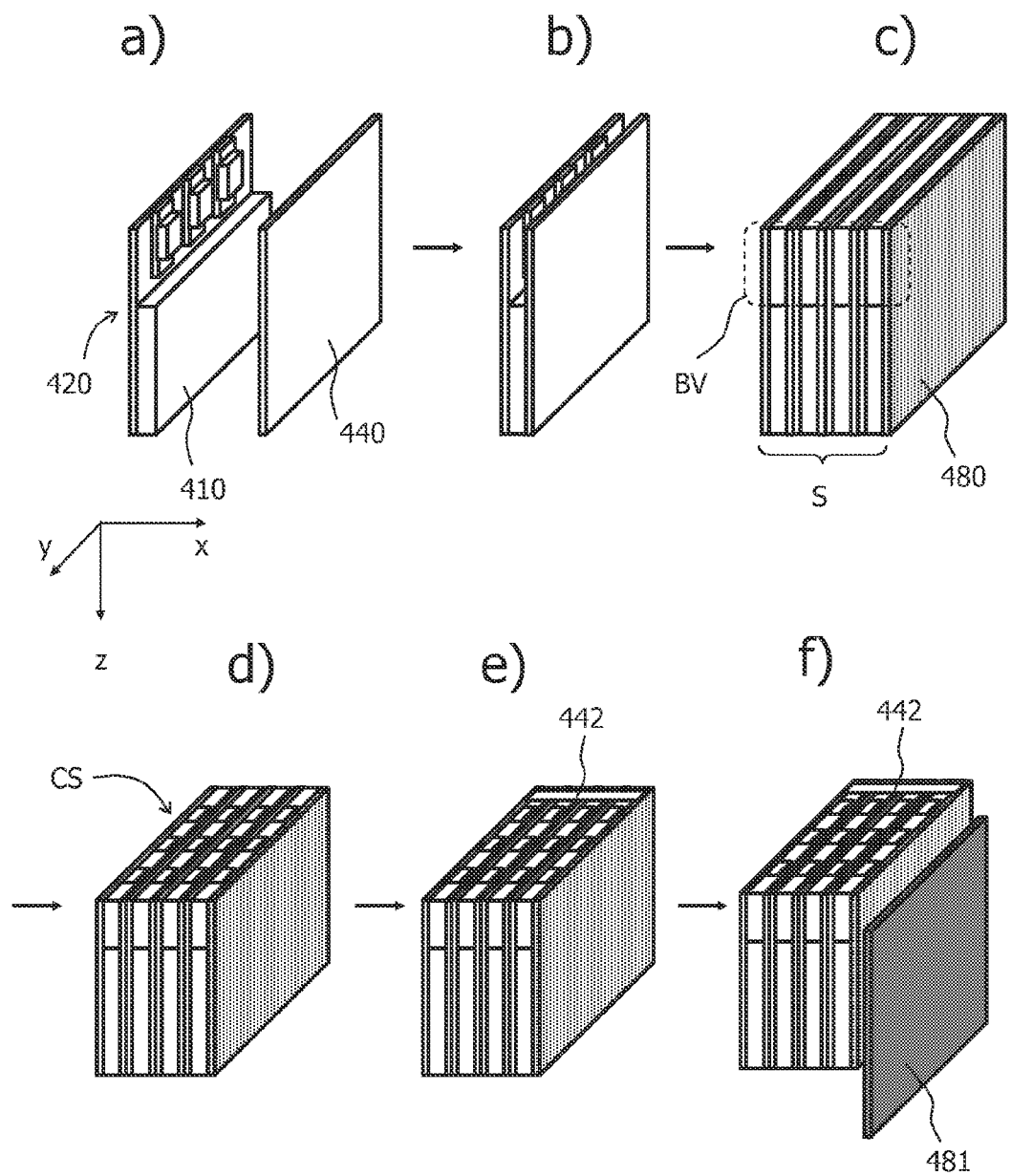
FIG. 17 illustrates consecutive steps of the manufacture of a radiation detector with a Peltier cooling device on a front surface.

FIG. 17 illustrates consecutive steps of the manufacturing of a radiation detector with a Peltier cooling device 480. The procedure is similar to that of FIG. 10 and comprises the following steps:

a) Bump bonding of a converter plate 410 to an anode interconnect layer 420 and a metal foil 440 representing the cathode interconnect layer, yielding b) single slabs.

c) Stacking of the slabs produced according to steps a)+b) in a face-to-face arrangement to form a stack S. As indicated in the Figure, the voids in the border volume BV are filled with an underfill material. Furthermore, Peltier elements 480 are attached to the front and/or the back side of the stack S. The Peltier elements 480 are provided with electrical connections to an appropriate power supply, but apart from that electrically isolated from other components of the device.

d) Removal of a volume from the border volume BV at the downstream side (top in the Figure) to open a contact surface CS.

e) Application of a back-end process for producing a redistribution layer including a bus 442 for a bias voltage supply to the cathode layers. To be more specific, the bus 442 of the redistribution layer is thermally connected to the cold side of the Peltier element 480 (see FIG. 17 f).

f) Attachment of a heat sink, e.g. a metal foil 481 to the hot side of the Peltier element(s) 480.

It should be noted that in this and similar embodiments it is beneficial to connect the cold side of the Peltier element with the metal sheets within the stack.

Figure 18:
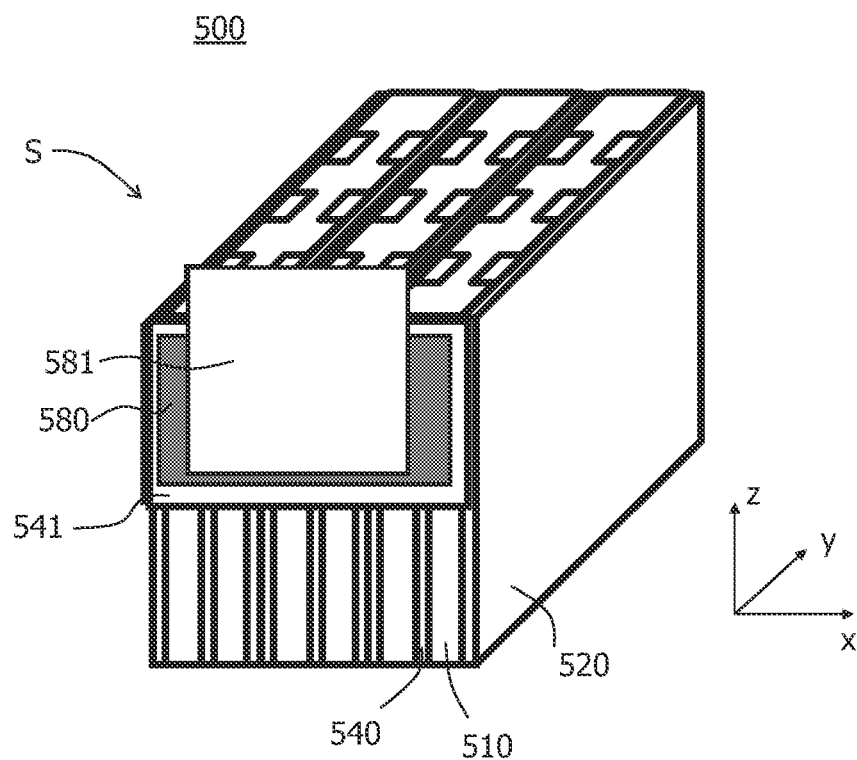
FIG. 18 illustrates a perspective view of a stack of converter plates and interconnect layers with a Peltier cooling device on a lateral surface.

A large area for heat conduction is available if the side walls of a stack of converter plates and interconnect layers are (also) metalized (cf. FIGS. 13-15). FIG. 18 illustrates this for one stack S of a radiation detector 500 with converter plates 510, anode layers 520, and cathode layers 540. The lateral face of this stack S is covered with a metal foil 541 that supplies the cathode layers 510 with a bias voltage and simultaneously serves as a heat sink for a Peltier element 580 that is attached to it.

The metal sheets within a stack have to be chosen according to mechanical properties and electrical conductivity. According to Wiedemann-Franz law the latter quantity scales with heat conductivity. For instance, Nickel can be used which has a specific heat conductivity of 90 W/(m·K). By construction, the cold side of the Peltier element has the electrical potential U of the metal sheets (cathode layers) in the stack (e.g. −150 V). The hot side has to be set to an electrical potential U+ΔU where ΔU is the supply voltage of the Peltier cooler. Electrical leads (not shown) for this voltage U+ΔU have also to be provided by the back-end process.

Assembly of a radiation detector 500 according to FIG. 18 is conducted in two phases. In the first phase a module of stacked converter plates and interconnect layers is fabricated yielding a functional X-ray detector. In the second phase the Peltier cooler can be attached to the side walls of the stack S, e.g. by gluing the cold side of the Peltier element 580 to the metallization 541 at both side walls (perpendicular to the slab direction). If desired, an additional heat conduction layer 581 can be attached to the Peltier cooling device 580.

Figure 19:
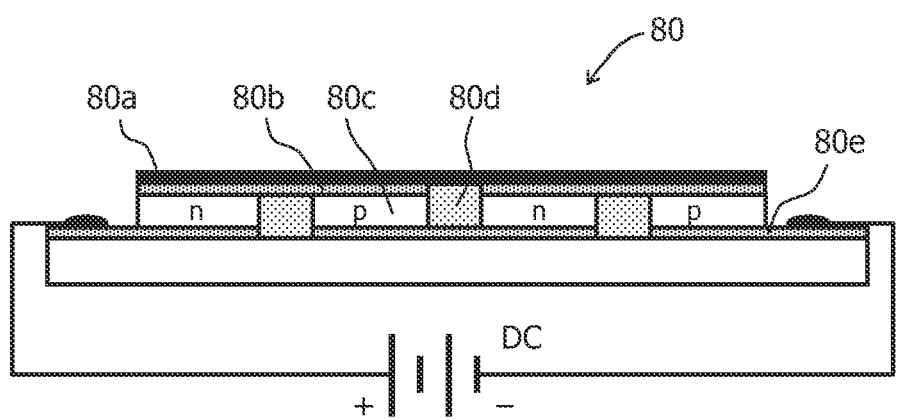
FIG. 19 illustrates schematically the principle of a Peltier cooling device that can be applied in the described radiation detectors.

FIG. 19 illustrates schematically the principle of a thermoelectric component that can be used as a Peltier cooling device in the radiation detectors described above. The thermoelectric Peltier cooling device 80 is based on n-doped and p-doped Bismuth-Telluride semiconductor materials (commercially available e.g. from nanoCoolers, Austin, USA). The device has a layered structure with (from top to bottom) a thermally conductive and electrically isolating top layer 80a, and electrically conductive layer 80b, p- and n-doped regions 80c disposed alternately next to each other in lateral direction, and a thermally and electrically conductive carrier 80e. The p- and n-doped regions 80c are separated from each other by thermally and electrically isolating blocks 80d such that a current provided by a DC power source can flow through the device on a meandering path.

One side of the Peltier cooling device 80 (e.g. the top side for the shown polarity of the voltage) will absorb heat (get cold) while the other side dissipates heat when DC current is applied. By reversing the direction of the current, the hot and cold sides can swap polarities (the hot side becomes the cold side and vice versa). The manufacturing process is very similar to thin-film manufacturing processes used for silicon integrated circuits (standard CMOS metal layer processes), but using Bismuth Telluride materials. So very thin cooling devices with large area can be built.

In summary, the incorporation of a very small cooling device in multilayer sensors has been described. One novel feature of this approach is that supply lines, i.e. the supply structure of the cathodic bias voltage, is also used to transfer heat from the stack.

Important applications of the described approaches are Computed Tomography (CT) with energy resolution, projection imaging with energy resolution, or any other application that may benefit from energy-resolving X-ray photon counting.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. A radiation detector with a stack (S) of converter plates and interconnect layers, wherein the interconnect layers extend with electrical leads into a rigid body filling a border volume (BV) lateral of the converter plates, and said leads end in a contact surface (CS) of the border volume.

2. The radiation detector according to claim 1, further comprising an external electrode system that is disposed on at least one surface of the stack.

3. The radiation detector according to claim 2, wherein the external electrode system is connected to a voltage supply for providing a voltage to it.

4. The radiation detector according to claim 2, wherein the interconnect layers comprise at least one "conductive interconnect layer" comprising a conductive material that extends through the whole thickness of this layer.

5. The radiation detector according to claim 2, wherein the interconnect layers comprise at least one "isolating interconnect layer" comprising an electrically isolating substrate with leads on one surface.

6. An imaging device, particularly an X-ray, CT, PET, SPECT or nuclear imaging device, comprising a radiation detector according to, claim 2.

7. The radiation detector according to claim 1, further comprising a Peltier cooling device for removing heat from the stack.

8. The radiation detector according to claim 7, wherein the Peltier cooling device is thermally connected to an electrical conductor that is electrically connected to components inside the stack (S).

9. The radiation detector according to claim 7, wherein the Peltier cooling device is disposed on a surface of the stack (S).

10. The radiation detector according to claim 1, wherein the leads of the interconnect layers are provided with enlargements in the contact surface (CS).

11. The radiation detector according to claim 10, wherein the enlargements comprise a metal on the contact surface (CS).

12. The radiation detector according to claim 10, wherein the enlargements comprise additional conductive material bound to the leads and cut in the contact surface (CS), particularly a wire, a metal block, or a solder bump.

13. The radiation detector according to claim 1, wherein at least one of the interconnect layers does not completely cut through the border volume (BV).

14. The radiation detector according to claim 1, wherein the interconnect layers comprise two groups and that there are two associated, distinct contact surfaces (CS, CS') of the border volume (BV) that are perpendicular to each other.

15. The radiation detector according to claim 1, wherein the interconnect layers comprise two groups and that there are two associated, distinct contact surfaces (CS, CS') of the border volume (BV).

16. A method for producing a radiation detector comprising the following steps: a) stacking converter plates and interconnect layers such that the interconnect layers extend with electrical leads into a border volume (BV) lateral of the converter plates; b) at least partially filling the voids between the interconnect layers in the border volume (BV) with a material; c) removing a volume from the border volume (BV) to expose the leads of the interconnect layers in a contact surface (CS).

17. The method according to claim 16, wherein the leads of the interconnect layers are provided with enlargements in the contact surface.

18. The method according to claim 17, wherein the enlargements comprise a metal on the contact surface.

19. The method according to claim 18, wherein the additional conductive material is at least one of a wire, a metal block, and a solder bump.

20. The method according to claim 17, wherein the enlargements comprise additional conductive material bound to the leads and cut in the contact surface.

\* \* \* \* \*